United States Patent
Chae

(10) Patent No.: US 7,609,912 B2
(45) Date of Patent: Oct. 27, 2009

(54) IMAGE TRANSFORMING DEVICE AND METHOD BASED ON EDGES

(75) Inventor: Won-Seok Chae, Mokpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 962 days.

(21) Appl. No.: 11/090,566

(22) Filed: Mar. 28, 2005

(65) Prior Publication Data

US 2005/0232515 A1    Oct. 20, 2005

(30) Foreign Application Priority Data

Apr. 20, 2004    (KR) ...................... 10-2004-0027030

(51) Int. Cl.
*G06K 9/00*    (2006.01)
*G06K 9/40*    (2006.01)

(52) U.S. Cl. ........................ 382/300; 382/254

(58) Field of Classification Search .............. 382/300, 382/254
See application file for complete search history.

(56) References Cited

U.S. PATENT DOCUMENTS

| | | | | |
|---|---|---|---|---|
| 5,754,710 A | * | 5/1998 | Sekine et al. ............... | 382/300 |
| 5,796,868 A | * | 8/1998 | Dutta-Choudhury ........ | 382/199 |
| 5,875,268 A | * | 2/1999 | Miyake ...................... | 382/276 |
| 6,608,942 B1 | * | 8/2003 | Le .............................. | 382/279 |
| 6,714,693 B1 | * | 3/2004 | Miyake ...................... | 382/300 |
| 7,437,020 B2 | * | 10/2008 | Yi ............................... | 382/300 |
| 2001/0048771 A1 | * | 12/2001 | Sasaki ........................ | 382/260 |

FOREIGN PATENT DOCUMENTS

| | | |
|---|---|---|
| JP | 2002-319020 | 10/2002 |
| JP | 2003-8884 | 1/2003 |
| KR | 2002-4246 | 1/2002 |
| KR | 2002-57527 | 7/2002 |

* cited by examiner

*Primary Examiner*—Wenpeng Chen
(74) *Attorney, Agent, or Firm*—Roylance, Abrams, Berdo & Goodman, LLP

(57) ABSTRACT

An image transforming apparatus and method include a linear interpolation block for generating linear interpolation information for a pixel to be interpolated between original pixels of a predetermined image; an edge information generating block for generating edge information and edge location information; a weight determining block for determining a weight for the linear interpolation information and the edge information of the interpolation pixel based on the edge location information; an interpolation information generating block for determining a pixel value of the interpolation pixel by reflecting the weight to the edge information and the linear interpolation information; and an interpolating block for generating the interpolation pixel based on the pixel value determined in the interpolation information generating block. Therefore, an image can be transformed into a high-resolution enlarged image with an edge area expressed clearly.

16 Claims, 7 Drawing Sheets

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 1 | 1 |
| 0 | 0 | 0 | 0 | 1 | 1 | 1 |
| 0 | 0 | 1 | 1 | 1 | 0 | 0 |
| 0 | 1 | 1 | 1 | 0 | 0 | 0 |
| 1 | 1 | 0 | 0 | 0 | 0 | 0 |

IMAGE TRANSFORMING DEVICE AND METHOD BASED ON EDGES

CROSS-REFERENCE TO RELATED APPLICATIONS

This application claims the benefit under 35 U.S.C. § 119 (a) from Korean Patent Application No. 2004-27030 filed on Apr. 20, 2004 with the Korean Intellectual Property Office, the entire contents of which are incorporated herein by reference.

BACKGROUND OF THE INVENTION

1. Field of the Invention

The present invention relates generally to an image transforming apparatus and a method thereof. More particularly, the present invention relates to an image transforming apparatus that can clearly display an edge area of an image when the image is enlarged or transformed into high-resolution image, and a method thereof.

2. Description of the Related Art

As electronic technology has been evolving, photographing devices such as digital cameras and mobile phones with a built-in camera have increased in popularity. Digital images photographed by the photographing devices can be magnified or reduced by a user. Also, they can be expressed more clearly by being transformed into high-resolution images, and the images can then be developed into photographs using a printer.

In order to enlarge the size of an image or transform it into a high-resolution image, an interpolation process where new pixels are interpolated between the pixels of the original image need to be performed. The interpolated pixel values are determined by using linear interpolation, where the values of pixels to be interpolated linearly are determined by considering of the distance between the original pixels around the pixels to be interpolated and the values of the original pixels. According to the linear interpolation method, interpolation is typically achieved in an image area without an edge, because values of adjacent pixels are usually similar. However, in the edge area where the difference between adjacent pixel values is distinct, the values of the adjacent pixels affect the pixel values to be interpolated. Therefore, the edge area becomes blurry, which is referred to as a blurring phenomenon.

Conventionally, in order to make the image in the edge clear and overcome the problem of linear interpolation, an image is divided into blocks, each of which is a group of a plurality of pixels based on a unit of n×m, and edge information for determining the pixel value of each pixel based on the edge in a block is generated. An image can be made clear by reflecting the edge information in the pixel interpolation.

FIG. 1 is a flowchart describing a conventional image transforming method, that is, a conventional pixel interpolation method. Referring to FIG. 1, if an image transforming command for magnifying an image or transforming an image into a high-resolution image is received, at step S10, linear interpolation information is generated by using the linear interpolation method. The linear interpolation information represents a location of a pixel to be interpolated and a value thereof. The value of the pixel to be interpolated can be obtained by multiplying the values of adjacent pixels by a weight based on the distance to the adjacent pixels and then adding up the multiplication result.

If the linear interpolation information is obtained, at step S20, edge information is calculated based on the pixel values of the original image and the linear interpolation information. To be specific, a block with the maximum pixel value and a block with the minimum pixel value are searched from among adjacent blocks, each having a plurality of pixels, and the average value of the pixel values are calculated. Next, the average value is compared with the linear interpolation information of each pixel. If the linear interpolation information is larger than the average value, the maximum value is allocated to the pixel. If the linear interpolation information is smaller than the average value, the minimum value is allocated to the pixel.

Subsequently, at step S30, a weight is determined based on the pixel values of the adjacent blocks. The weight denotes a ratio of linear interpolation information to edge information. In other words, in a block with an edge, the weight of the edge information is set high and the weight of the linear interpolation information is set relatively low. In a block without an edge, the weight of the linear interpolation information increases relatively and the weight of the edge information decreases.

At step S40, interpolation information is generated finally by reflecting the established weight. That is, the location and value of a pixel to be interpolated are determined. Accordingly, at step S50, a frame to be interpolated is generated and thus pixel interpolation is achieved.

Meanwhile, in a case where pixel interpolation is performed in the method of FIG. 1 and if an image with an area where a brightness value increases or decreases gradually, the order of the brightness value changes, and bright pixels and dark pixels appear irregularly.

FIG. 2 is a diagram describing the effect of image quality degradation in a high-resolution image when a low-resolution image is enlarged by 3×3 times and then transformed into the high-resolution image. In FIG. 2, it is assumed that the low-resolution image includes pixels a, b, c, . . . , i, and the high-resolution image includes blocks A, B, C, . . . , I wherein a block is formed of 9 pixels.

Referring to FIG. 2, the low-resolution image which is expressed with 9 pixels is transformed into the high-resolution image with a total of 81 pixels by linearly interpolating two pixels between the pixels a, b, c, . . . , i. As aforementioned, the edge information is obtained by calculating the average value of the maximum value and the minimum value from among the pixel values of adjacent blocks and allocating the maximum value and the minimum value by determining the value of each pixel based on the average value. Since the edge information is changed into the maximum value or the minimum value among adjacent pixels, there is a problem that the expressed image becomes very sharp.

Meanwhile, if the original image is a low-resolution image that becomes brighter in a direction from a pixel "a" to a pixel "i" in FIG. 2, the high-resolution image should become brighter in a direction from a block A to a block I. To be more specific, if it is assumed that the entire pixel values of a block A are 100 and that of a block E is 110 and that of a block I is 120, the maximum pixel value of the block E is 120 and the minimum pixel value is 100. Accordingly, the average value is 110. When the linear interpolation information of each pixel in the block E, that is, the pixel value is compared with the average value, the block E is divided into an area with a pixel value larger than the average value, and an area with a pixel value smaller than the average value. To express an edge, the maximum pixel value 120 is allocated to the area with a pixel value larger than the average value and the minimum pixel value 100 is allocated to the area with a pixel value smaller than the average value. Likewise, when the block I is divided into two areas, the area in the direction of the block E has the minimum pixel value 110 and the other area has the maximum pixel value 130. Therefore, between the block E and the block I, there is an area where the pixel values are changed sequentially in the order of 100, 120, 110, and 130. That is, the edge area is expressed having bright and dark areas and this causes a problem in that the edge appears to have two edges.

Also, when the weight is imposed, it is imposed on the blocks uniformly. Therefore, if the weight for the edge information is increased, the edge area can be shown very clearly but detailed information on the other area around the edge disappears and, if the weight is reduced, the blurring phenomenon occurs and the edge area cannot be expressed distinctively, which is a problem with the linear interpolation method.

SUMMARY OF THE INVENTION

It is an aspect of the present invention to provide an image transforming apparatus that can transform an image into a high-resolution image by generating a smooth and distinct edge area when the image is enlarged or transformed into a high-resolution image, and a method thereof.

In accordance with an aspect of the present invention, there is provided an image transforming apparatus, which includes a linear interpolation block for generating linear interpolation information for an interpolation pixel to be interpolated between original pixels of a predetermined image; an edge information generating block for generating edge information which represents a pixel value of a pixel for expressing an edge and generating edge location information for expressing a location of a pixel that forms an edge surface among the image; a weight determining block for determining a weight for the linear interpolation information and the edge information of the interpolation pixel based on the edge location information; an interpolation information generating block for determining a pixel value of the interpolation pixel by reflecting the weight to the edge information and the linear interpolation information; and an interpolating block for generating the interpolation pixel based on the pixel value determined in the interpolation information generating block.

The image transforming apparatus may further include an edge determining block for determining whether a predetermined block is an edge block containing the edge surface. If the block is not determined to be the edge block, the interpolating block generates the interpolation pixels based on the linear interpolation information.

The edge information generating block includes a threshold value determining unit for determining a predetermined upper threshold value and a predetermined lower threshold value; a primary edge information generating unit for comparing the linear interpolation information with the upper threshold value and the lower threshold value and generating primary edge information for expressing pixel values of the pixels in the block and primary edge location information for expressing the location of a pixel that forms the edge surface; and a filtering unit for converting the primary edge information into the edge information by performing median filtering and converting the primary edge location information into the edge location information based on the converted edge information.

If the primary edge information generating unit can generate primary edge information and primary edge location information which are different according to each area by dividing the block into a first area where the linear interpolation information is larger than the upper threshold value, a second area where the linear interpolation information is smaller then the lower threshold value, and a third area where the linear interpolation information is larger than the upper threshold value but smaller then the lower threshold value. That is, with respect to the first and second areas, the maximum pixel value and the minimum pixel value among adjacent pixel values are allocated as the primary edge information, wherein the third area is an edge area. To the primary edge information, a bit value '0' is allocated. With respect to the third area, a median between the maximum pixel value and the minimum pixel value is calculated based on a predetermined equation and the result is allocated as the primary edge information. To the primary edge location information, a bit value '1' can be allocated.

The filtering unit determines a predetermined size of a window with a predetermined pixel of the block at the center, arranges primary edge information of each pixel of the window sequentially, and determines a median thereof as the edge information of the pixel.

The weight determining block can determine a weight for edge information of each pixel in consideration of a distance to a non-edge block among adjacent blocks with respect to each pixel of the block and a distance from an edge surface within the block.

The interpolation information generating block includes a first multiplier for multiplying the edge information by a first weight; a second multiplier for multiplying the linear interpolation information by a second weight; and an adder for adding operation results of the first multiplier and the second multiplier.

A method for transforming an image, includes the steps of a) generating linear interpolation information for an interpolation pixel to be interpolated between original pixels of a predetermined image; b) generating edge information which represents a pixel value of a pixel for expressing an edge of the image and generating edge location information for expressing the location of a pixel that forms an edge surface; c) determining a weight for the linear interpolation information and the edge information of the interpolation pixel based on the edge location information; d) determining a pixel value of the interpolation pixel by reflecting the weight to the edge information and the linear interpolation information; and e) generating the interpolation pixel based on the determined pixel value.

The method further includes the steps of f) determining whether a predetermined block is an edge block that includes the edge surface; and g) generating the interpolation pixels based on the linear interpolation information, if the block is not determined to be the edge block.

The step b) includes the sub-steps of b1) determining a predetermined upper threshold value and a predetermined lower threshold value; b2) comparing the linear interpolation information with the upper threshold value and the lower threshold value; b3) generating primary edge information for indicating pixel values of the pixels in the block and primary edge location information for indicating the location of a pixel that forms the edge surface; b4) transforming the primary edge information into the edge information by performing median filtering; and b5) converting the primary edge location information into the edge location information based on the converted edge information.

In the step b1), the median between the maximum pixel value and the minimum pixel value among pixel values of adjacent pixels of the original pixels is obtained and the upper threshold value and the lower threshold value are calculated by adding/subtracting an arbitrary coefficient to/from the median value.

The step b3) includes the steps of dividing the block into a first area where the linear interpolation information is larger than the upper threshold value, a second area where the linear interpolation information is smaller then the lower threshold value, and a third area where the linear interpolation information is larger than the upper threshold value but smaller than the lower threshold value; allocating the maximum pixel value and the minimum pixel value as the primary edge information among the adjacent pixel values to the first and second areas, respectively; allocating a bit value '0' as the primary edge location information; and allocating a median between the maximum value and the minimum value as the primary edge information to the third area; and allocating the bit 1 as the primary edge location information.

The step b4) includes the sub-steps of b4-1) determining a predetermined size of a window with a predetermined pixel of the block at the center; and b4-2) arranging primary edge information of each pixel of the window sequentially, and determining a median thereof as the edge information of the pixel.

In the step c), a weight for edge information of each pixel can be determined in consideration of a distance to a non-edge block and a distance to an edge area within the block among the adjacent blocks with respect to each pixel of the block.

The step d) includes the sub-steps of d1) multiplying the edge information by a first weight; d2) multiplying the linear interpolation information by a second weight; and d3) adding operation results of the step d1) and the step d2).

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

Figure 1:
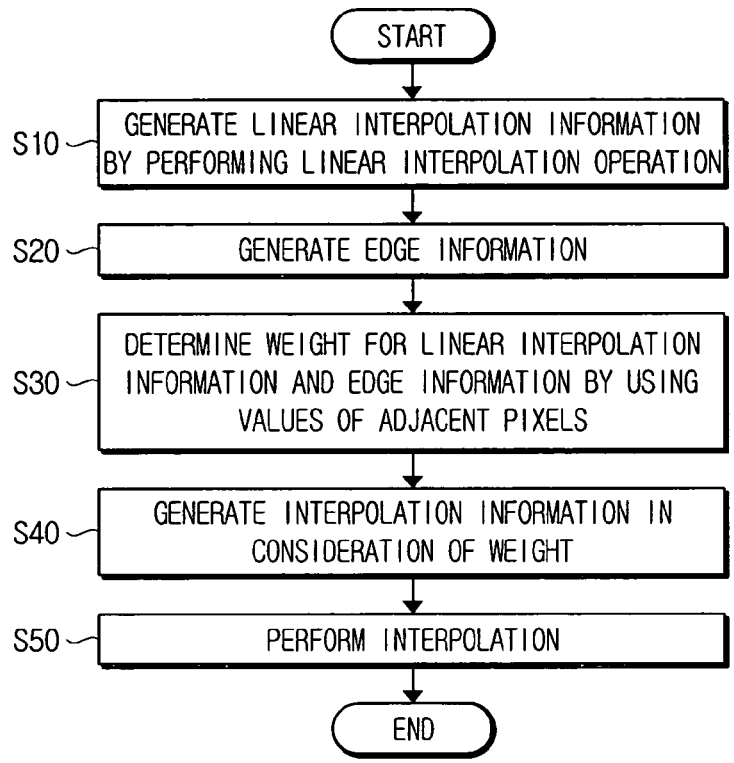
FIG. 1 is a flowchart illustrating a conventional image transforming method.
Figure 2:
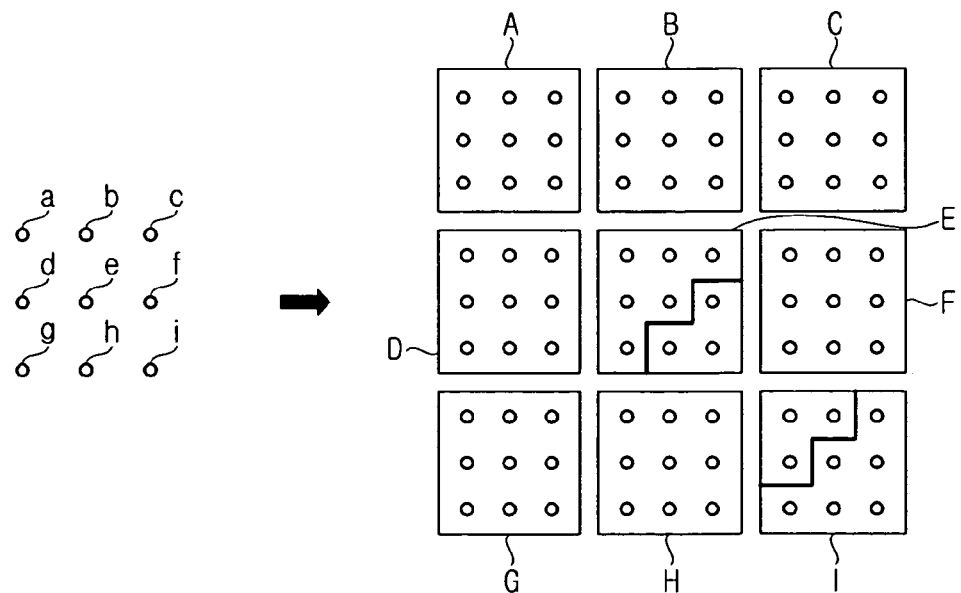
FIG. 2 is a diagram illustrating an image quality degradation phenomenon on the edge area that occurs in the a conventional image transforming process.

Certain embodiments of the present invention will be described in greater detail with reference to the accompanying drawings.

In the following description, the same drawing reference numerals are used for the same elements throughout the drawings. The matters defined in the description such as a detailed construction and elements are exemplary. Thus, it should be apparent that the present invention can be performed without the examples. Also, well-known functions or constructions are not described in detail since they would obscure the invention in unnecessary detail.

Figure 3:
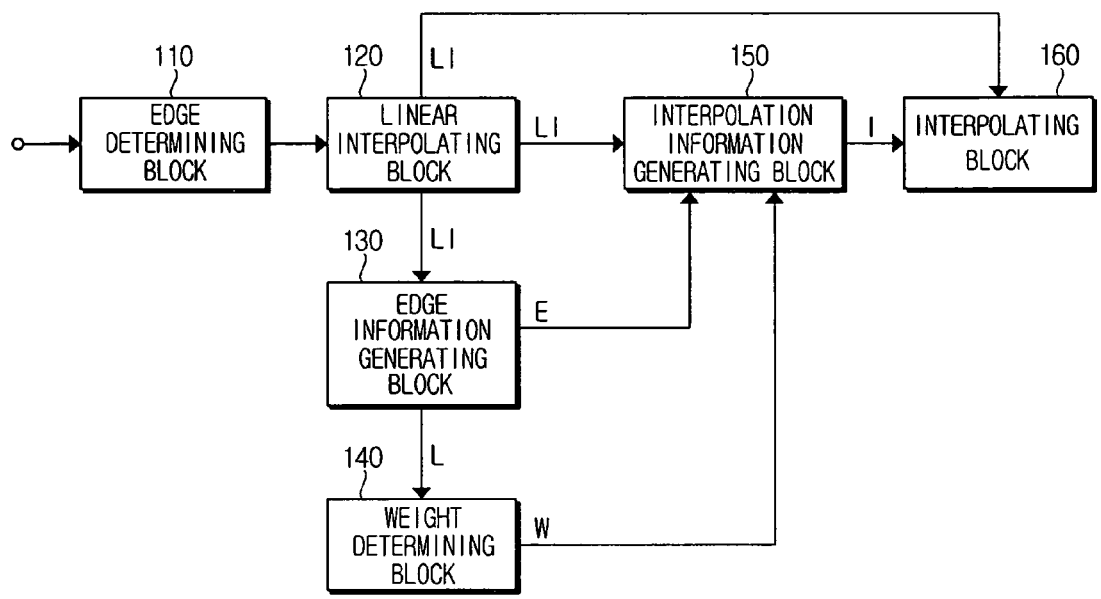
FIG. 3 is a block diagram illustrating an image transforming apparatus in accordance with an embodiment of the present invention.

FIG. 3 is a block diagram of an image transforming apparatus in accordance with an embodiment of the present invention. As shown in FIG. 3, the image transforming apparatus comprises an edge determining block 110, a linear interpolating block 120, an edge information generating block 130, a weight determining block 140, an interpolation information generating block 150, and an interpolating block 160.

The edge determining block 110 determines whether each pixel of an input image belongs to an edge area or a non-edge area. To make the determination, the edge determining block 110 divides the input image into a plurality of blocks, each containing a plurality of pixels, calculates an edge degree of each block and then compares the edge degree with a predetermined threshold value. As a result, if the edge degree exceeds the threshold value, it determines that the block is an edge block including an edge area. If the edge degree is not more than the threshold value, the edge determining block 110 determines that the block is a non-edge block that does not include an edge area. The edge degree is a numerical value expressing a possibility that a block could include an edge area. In short, the difference between the maximum value and the minimum value among pixel values included in one block can be used as the edge degree. Therefore, it can be determined that, if the edge degree of a block exceeds a predetermined threshold value, the block is an edge block that includes an edge area. If the edge degree is not more than the threshold value, the block is a non-edge block that does not include an edge area. With respect to a non-edge block, edge information does not need to be calculated. Thus, the edge determining block 110 only detects an edge block in order to relieve the operational requirements.

When the edge block containing an edge area is extracted in the edge determining block 110, the linear interpolating block 120 generates linear interpolation information (LI) of a pixel to be interpolated using enlargement magnification based on each pixel of the original input image. As described above, the linear interpolation information represents a pixel value of a pixel to be interpolated into spaces between pixels of the original input image in the linear interpolation method. The pixel value of a pixel to be interpolated is determined by linearly considering pixel values of adjacent pixels and the distance to the adjacent pixels. If a block is an edge block containing an edge area, the linear interpolating block 120 transmits the determined linear interpolation information to the edge information generating block 130.

The edge information generating block 130 generates edge information (E) and edge location information (L) based on the linear interpolation information. The edge location information indicates the location of the edge area within a block. The edge location information is transmitted to the weight determining block 140. The edge information is a pixel value of each pixel in the block containing an edge area. The edge information is transmitted to the interpolation information generating block 150. Meanwhile, the edge information generating block 130 goes through two steps of information generating processes in order to generate the edge information and the edge location information. In the first step, the edge information generating block 130 establishes two threshold values based on each pixel value of the original image. If the edge information generating block 130 receives linear interpolation information, it compares threshold values and detects that pixels having a pixel value between the two threshold values belong to the edge area. Accordingly, one block is divided into two sections based on an edge area, and the primary edge information (Et) is generated by allocating the maximum pixel value and the minimum pixel value of adjacent blocks of each section. Meanwhile, the edge information generating block 130 can generate the primary edge location information (Lt) which indicates the location of a pixel of an edge area by allocating a '1' and '0' to the edge area and the non-edge area, respectively. In the second step, the final edge information and edge location information are generated by performing median filtering based on the generated primary edge information and the generated primary edge location information. Further detailed operations of the edge information generating block 130 will be described below.

The weight determining block 140 determines a weight for each pixel, such as a weight for a pixel of an edge area and a weight for a pixel of an area neighboring an edge within a block, by checking the edge location information. That is, with respect to a pixel of an edge area, a high weight is given to the edge information. With respect to a pixel of a non-edge area, a high weight is given to the linear interpolation information.

The interpolation information generating block 150 generates interpolation information based on linear interpolation information, edge information, and a weight. The interpolation information is expressed as the following equation:

$$I = W \times E + (1-W) \times LI \qquad \text{Equation 1}$$

wherein I denotes interpolation information generated finally.

The generated interpolation information is transmitted to the interpolating block 160, and the interpolating block 160 determines the pixel value of a pixel to be interpolated based on the interpolation information finally.

Meanwhile, if a block is determined to be a non-edge block, which does not include an edge area, in the edge determining block 110, the linear interpolating block 120 transmits the determined linear interpolation information directly to the interpolating block 160. Accordingly, with respect to a non-edge block, the interpolating block 160 determines the pixel value of a pixel to be interpolated based on the linear interpolation information.

Figure 4:
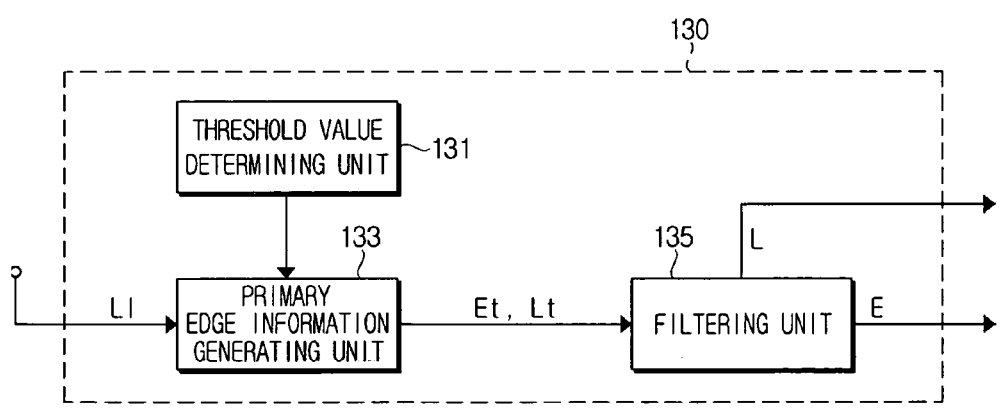
FIG. 4 is a block diagram illustrating an edge information generating block of FIG. 3.

FIG. 4 is a block diagram depicting the edge information generating block 130 of FIG. 3. As shown in FIG. 4, the edge information generating block 130 comprises a threshold value determining unit 131, a primary edge information generating unit 133, and a filtering unit 135.

The threshold value determining unit 131 determines two threshold values Th1 and Th2. In order to determine the threshold values, the threshold value determining unit 131 searches for a pixel having the maximum pixel value and for a pixel having the minimum pixel value from among adjacent pixels with respect to each pixel of the original image. When the maximum pixel value and the minimum pixel value are detected, an average value between them is calculated. A lower threshold value Th2 is obtained by subtracting an a value from the average value.

If the upper threshold value Th1 and the lower threshold value Th2 are determined in the threshold value determining unit 131, the primary edge information generating unit 133 compares the linear interpolation information transmitted from the linear interpolating block 120 with the upper and lower threshold values. For a pixel having a linear interpolation information larger than the upper threshold value (LI>Th1), the maximum pixel value (Max) of the pixel values of adjacent blocks is established to be the primary edge information (Et) and a bit value '0' is allocated to the primary edge location information. For a pixel having a linear interpolation information smaller than the lower threshold value (LI<Th2), the minimum pixel value (Min) of the pixel values of adjacent blocks is established to be the primary edge information and a bit value '0' is allocated to the primary edge location information. In the mean time, with respect to a pixel having the linear interpolation information smaller than the upper threshold value but larger than the lower threshold value (Th1>LI>Th2), a bit value '1' is allocated to the primary edge location information. That is, an area with a pixel value smaller than the upper threshold value but larger than the lower threshold value (Th1>pixel value>Th2) is an edge area. Pixel values of the pixels of the edge area, which is the primary edge information, can be expressed as the following equation:

$$Et = \frac{(\text{Max} - \text{Min}) \times (LI - Th1)}{(Th1 - Th2)} + \text{Min} \qquad \text{Equation 2}$$

wherein LI denotes linear interpolation information, and Max and Min denote the maximum pixel value and the minimum pixel value among adjacent blocks, respectively.

Conventional technology expresses an edge by dividing an edge block, which includes an edge area, into an area having the maximum pixel value and a block having the minimum pixel value. This technology has a problem in that the edge is expressed sharply. However, the problem can be solved by obtaining an actual edge area based on the two threshold values and determining the pixel values of the pixels of the edge area based on equation 2.

Figures 5, 6:
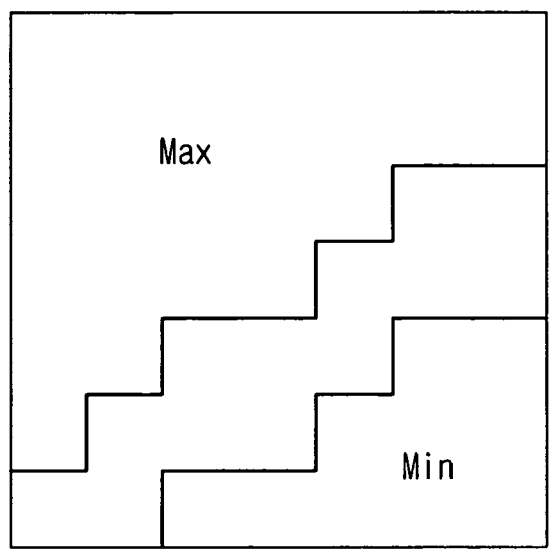
FIG. 5 is a diagram illustrating primary edge information primarily generated in an edge information generating block of FIG. 4.
FIG. 6 is a diagram illustrating primary edge location information primarily generated in the edge information generating block of FIG. 4.

FIG. 5 is a diagram of the primary edge information generated in the primary edge information generating unit 133. Referring to FIG. 5, a block is divided into a maximum pixel value area, which will be referred to as a maximum area, and a minimum pixel value area, which will be referred to as a minimum area based on a predetermined area. In the maximum area, the primary edge information is unified with the maximum pixel value among the adjacent blocks and, in the minimum area, it is unified with the minimum pixel value among the adjacent blocks. The reference area for determining the maximum area and the minimum area is an edge area and it has the primary edge information obtained based on equation 2.

FIG. 6 is a diagram of the primary edge location information generated in the primary edge information generating unit 133. Referring to FIG. 6, the location of a pixel that belongs to an edge area is expressed precisely by allocating a bit value '1' to the edge area and allocating a bit value '0' to the non-edge area.

When the primary edge information and the primary edge location information are generated in the primary edge information generating unit 133 by using the aforementioned method, the filtering unit 135 finally generates the edge information and the edge location information based on the primary edge information and the primary edge location information.

In accordance with an embodiment of the present invention, the filtering unit 135 can compute edge information and edge location information preferably using a median filtering method. Median filtering is a method where filtering is performed by covering pixels of an image with a window, arranging the pixels in the window sequentially, and substituting the median with a pixel value of the image that corresponds to the center point of the window. The median filtering is a non-linear area process. It has a property that a sharp edge or a delicate part of an image is preserved. It should be appreciated by those skilled in the art that other types of filtering methods can be used without departing from the scope of the present invention.

Figure 7A:
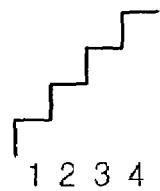
FIGS. 7A to 7D are diagrams illustrating a process of generating edge information in the edge information generating block of FIG. 4 in one-dimensional.

FIGS. 7A to 7D are diagrams illustrating a process of generating edge information in the edge information generating block 130 in one-dimension. FIG. 7A shows a pixel value of the original image. According to FIG. 7A, the original image is brightened in the order of 1, 2, 3, and 4 sequentially.

Figure 7B:
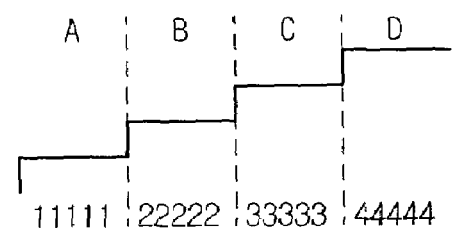

FIG. 7B is a diagram illustrating linear interpolation information generated by performing linear interpolation to enlarge the original image fivefold. According to FIG. 7B, the original image is enlarged into four blocks A, B, C and D, each including five pixels, and the pixel values of each block is expressed as 11111, 22222, 33333, and 44444.

Figure 7C:
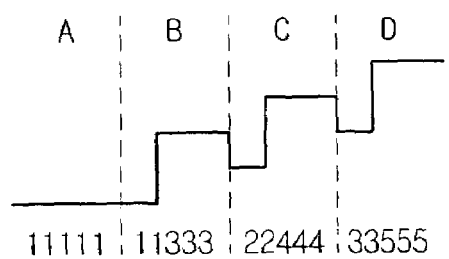

FIG. 7C is a diagram of the primary edge information generated based on the linear interpolation information. Referring to FIG. 7C, the minimum pixel value among the adjacent blocks of the block B is 1 of the block A, and the maximum pixel value is 3 of the block C. Therefore, the pixels of the block B can be marked as 11333. Similarly, the pixels of the block C are expressed as 22444 and, if the maximum pixel value of the adjacent blocks is assumed to be 5, the pixel values of the block D are expressed as 33555. Since the pixel values of the blocks B, C, D which include an edge are changed in the order of 3, 2, 4, 3, and 5, the edge area becomes bright and then dark on a screen, which is a problem. If the pixel values of the edge area are calculated separately based on equation 2, the edge area can be expressed smoothly but the problem of FIG. 7C still exists. Therefore, for convenience, illustrations on the effect of calculating the pixel values of the edge area based on equation 2 will be omitted in FIG. 7C.

Figure 7D:
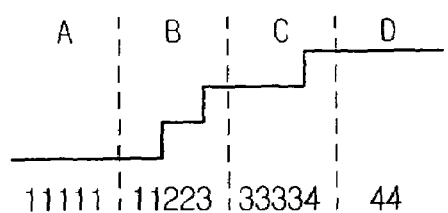

FIG. 7D is a diagram of a process of generating edge information by performing median filtering on the primary edge information of FIG. 7C. To be specific, the size of a window for median filtering is determined first. If the window is too small, inessential information may not be filtered out. If the window is too large, even essential information may be filtered out. Thus, it is preferable that the size of the window should be larger than an enlargement magnification and smaller than twice as large as the enlargement magnification. In short, since FIGS. 7A to 7D illustrate a case where the original image is enlarged fivefold, the size of the window for median filtering can be established at 7. Subsequently, pixel values of the pixels of each block in the range of the window are checked and substituted with the median thereof. The pixel values of the block B of FIG. 7C are expressed as 11333 sequentially. Herein, with respect to '1' which is illustrated in the first position, the pixel values in the window are arranged in the order of 3311111 and the median is '1.' If the median filtering is performed with respect to the '1' which is illustrated in the second position, the pixel values are arranged in the order of 3331111 and thus the median is 1. If the median filtering is performed with respect to '3' which is illustrated in the third position, the pixel values are arranged in the order of 3332111 and thus the median is 2. Therefore, the number '3' which is illustrated in the third position is substituted by '2.' If the median filtering is performed with respect to each pixel in this method, the pixel values of the blocks A, B, C, and D can be expressed as 11111, 11223, 33334, 44 . . . , which is shown in FIG. 7D.

Accordingly, the primary edge information of FIG. 7C is transformed into edge information with increasing brightness values as shown in FIG. 7D. Since this changes the location of edges expressed in the blocks B and C, the primary edge location information is also changed. During the median filtering, the speed can be improved by obtaining the median only with respect to predetermined pixels through equal sampling, instead of obtaining the median from among all the pixels in the window.

The edge location information generated in the edge information generating block 130 is transmitted to the weight determining block 140. The weight determining block 140 determines a weight for edge information in order to stress the edge in an exact location and make the edge connect smoothly with the adjacent blocks. A weight can be calculated based on equation 3 by considering a distance from a current pixel to an adjacent non-edge block, which does not include an edge area, and a distance from the current pixel to an edge area in a block including the edge area:

$$w = \frac{d1}{d1 + d2} \qquad \text{Equation 3}$$

wherein d1 denotes a distance from the current pixel to a non-edge block; and d2 denotes a distance from the current pixel to an edge area.

As described above, a non-edge block is a block whose edge degree calculated in the edge determining block 110 is not more than a predetermined threshold value, and an edge area is an area whose edge location information is 1 from among edge blocks whose edge degree exceeds the predetermined threshold value. As expressed in equation 3, the weight determining block 140 does not determine the weight on a block basis but determines the weight on a pixel basis. Therefore, it is possible to provide detailed information on pixels around the edge. The weight determined in the weight determining block 140 is transmitted to the interpolation information generating block 150.

The interpolation information generating block 150 finally determines interpolation information, which is a pixel value of a pixel to be interpolated, by reflecting a first weight (w) and a second weight (1-w) to the edge information and the linear interpolation information.

Figure 8:
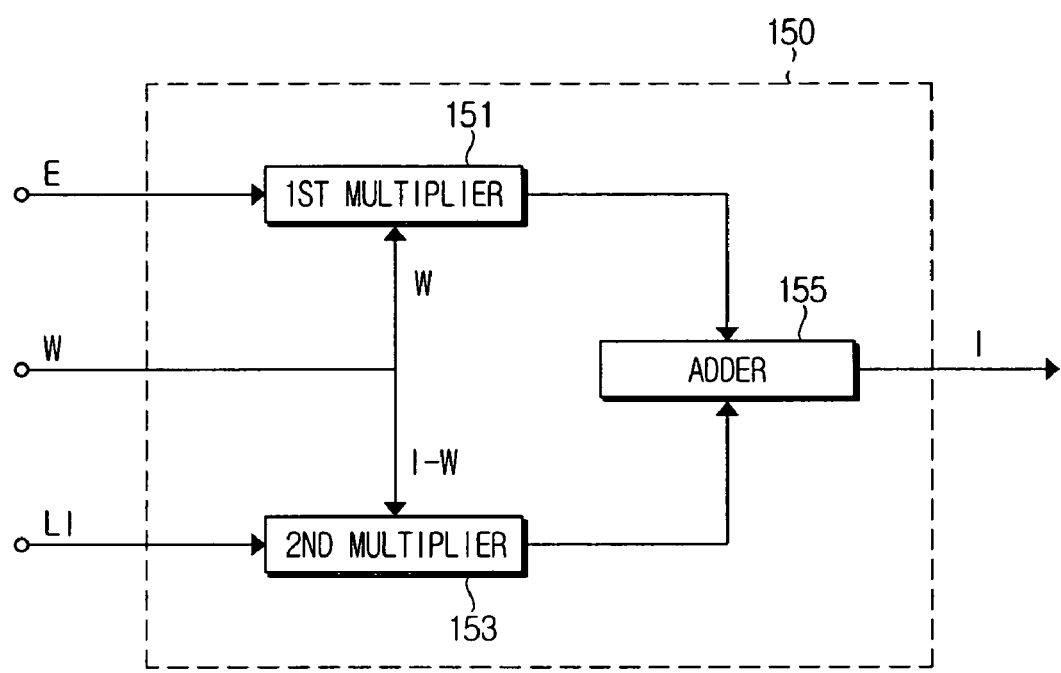
FIG. 8 is a block diagram illustrating an interpolation information generating block of FIG. 3 in detail.

FIG. 8 is a block diagram of the interpolation information generating block 150 in detail. As shown in FIG. 8, the interpolation information generating block 150 comprises a first multiplier 151, a second multiplier 153, and an adder 155. The first multiplier 151 multiplies the edge information transmitted from the edge information generating block 130 by a first weight (w), and the second multiplier 153 multiplies the linear interpolation information transmitted from the linear interpolating block 120 by a second weight (1-w). The adder 155 adds the resulting output from the first and second multipliers 151 and 153 and outputs the additional result as interpolation information. The interpolating block 160 interpolates a pixel between the pixels of the original image based on the interpolation information. If the edge determining block 110 determines a block to be a non-edge block, the interpolating block 160 can reduce the unnecessary operational burden by interpolating a pixel based on the linear interpolation information without the change.

Figure 9:
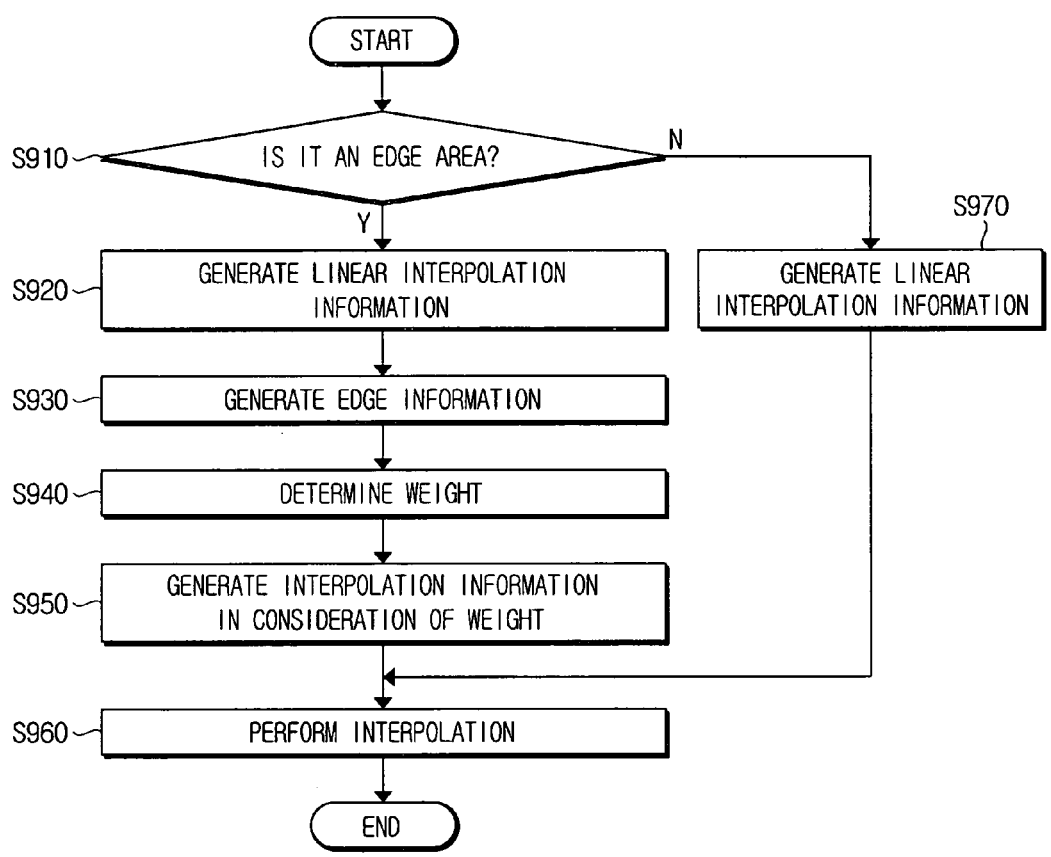
FIG. 9 is a flowchart illustrating an image transforming method in accordance with an embodiment of the present invention.

FIG. 9 is a flowchart illustrating an image transforming method in accordance with an embodiment of the present invention. As shown in FIG. 9, at step S910, it is determined whether each block of an input image includes an edge upon an image transformation command.

If a block is determined to be an edge block which includes an edge, at step S920, linear interpolation information (LI) is generated based on a linear interpolation method.

Subsequently, at step S930, edge information (E) and edge location information (L) are generated by considering the generated linear interpolation information and the maximum and minimum pixel values of adjacent pixels. The edge information and the edge location information are generated through primary edge information and primary edge location information and through a transform process that transforms the primary edge information and the primary edge location information by performing median filtering.

Subsequently, at step S940, a weight (w) to be applied to the linear interpolation information and the edge information is determined with respect to pixels in the edge area and pixels in the non-edge area based on the above-generated edge location information. The weight is determined based on each pixel that belongs to an edge block containing an edge area.

At step S950, interpolation information (I) is generated in consideration of the above-determined weight. The generated interpolation information signifies a pixel value of a pixel to be interpolated.

At step S960, a pixel is interpolated based on the interpolation information and enlargement magnification.

If it is determined that a block is a non-edge block which does not contain an edge area at step S910, then at step S970, only linear interpolation information is generated in order to relieve operational burdens and interpolation is performed at step S960, because the edge information and edge location information scarcely have an influence.

Figure 10:
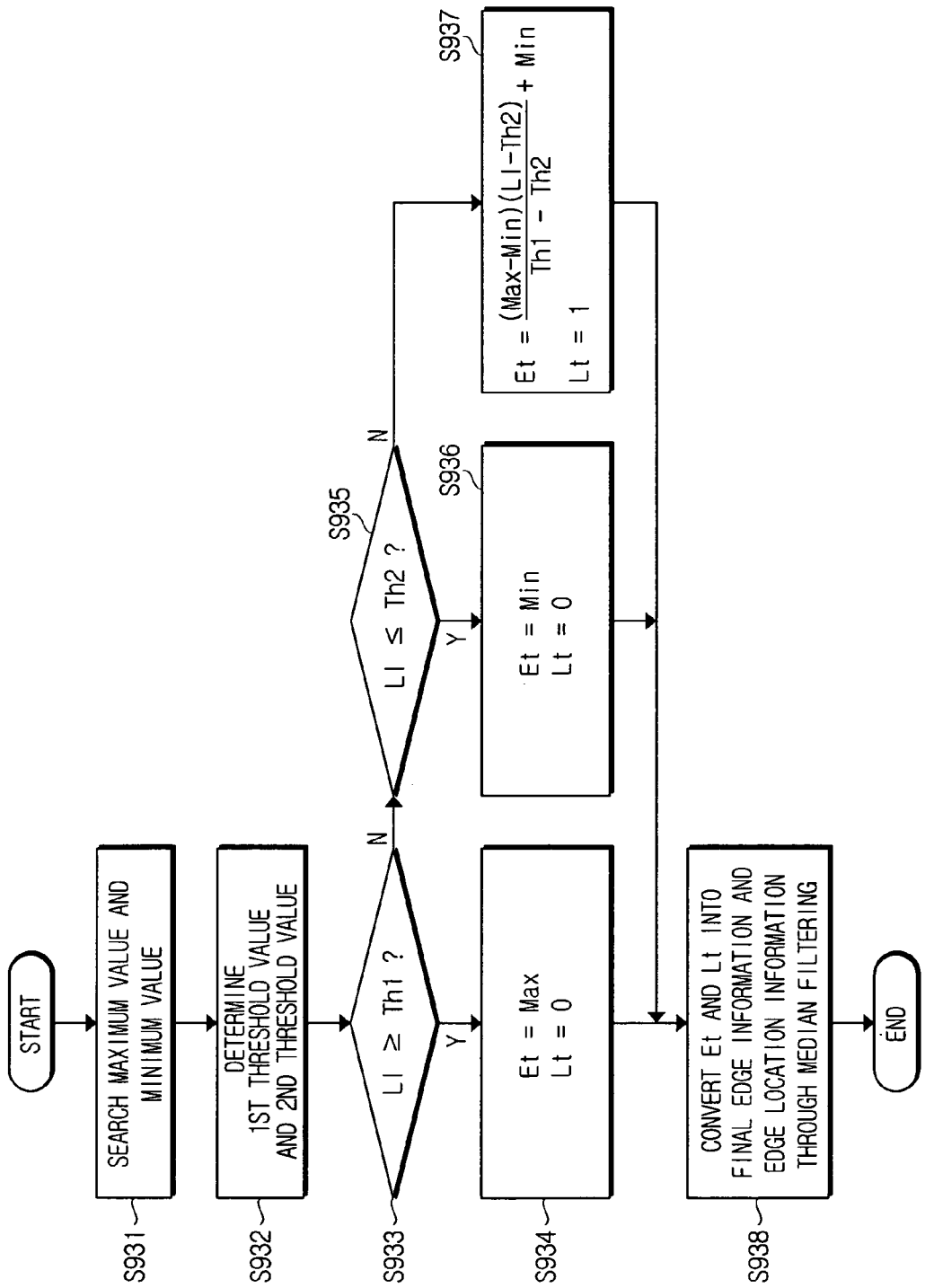
FIG. 10 is a flowchart illustrating the edge information generating process of FIG. 9 in detail.

FIG. 10 is a flowchart illustrating the edge information generating process of step S930 in detail. Referring to FIG. 10, at step S931, the maximum pixel value and the minimum pixel value are searched by examining the entire pixel values of adjacent blocks.

If the maximum pixel value and the minimum pixel value are searched, at step S932, a predetermined upper threshold value Th1 and a predetermined lower threshold value Th2 are determined based on the maximum and minimum pixel values. The upper threshold value Th1 and the lower threshold value Th2 can be determined based on an equation expressed as:

$$Th1 = \frac{Max + Min}{2} + \alpha, \quad Th2 = \frac{Max + Min}{2} - \alpha \qquad \text{Equation 4}$$

wherein $\alpha$ is an arbitrary coefficient determined based on an enlargement magnification.

If $\alpha$ is too large, the edge area is widened and thus the edge can become unclear. If $\alpha$ is too small, the edge area is narrowed excessively and thus the edge can be expressed sharply. The optimum size is determined through experiments.

If the threshold values Th1 and Th2 are determined, the linear interpolation information is compared with the threshold values Th1 and Th2 at steps S933 and S935, at steps S934, S936, and S937, the block is divided into a maximum area to which the maximum pixel value is allocated, a minimum area to which the minimum pixel value is allocated, and an edge area to which a median value is allocated.

In short, with respect to a pixel of step S933 whose linear interpolation information is larger than the upper threshold value (LI>Th1), at step S934, the maximum pixel value (Max) is established as the primary edge information (Et) and a bit value '0' is allocated to the primary edge location information.

If a pixel with the linear interpolation information is smaller than the upper threshold value (LI<Th1) at step S933, it is compared again with the lower threshold value Th2 at step S935.

With respect to a pixel whose linear interpolation information is smaller than the lower threshold value Th2, at step S936, the minimum pixel value (Min) is established as the primary edge information and a bit value '0' is allocated to the primary edge location information.

With respect to a pixel having linear interpolation information smaller than the upper threshold value Th1 but larger than the lower threshold value Th2 (Th1>LI>Th2), at step S937, the pixel is determined to be a pixel having n edge and a bit value '1' is allocated to the primary edge location information. Also, at step S937, the median between the maximum pixel value and the minimum pixel value is established as the primary edge information based on the equation 2. Therefore, one block is divided into a maximum area, a minimum area, and an edge area which determines the two areas. Since the median of the maximum pixel value and the minimum pixel value is established in the edge area, the conventional problem that the edge is expressed sharply is improved.

If the primary edge information and the primary edge location information are generated, at step S938, the final edge information and the final edge location information are generated through median filtering. Since the location of the edge area can be known precisely from the primary edge location information, the location where the median filtering is to be performed can be determined.

The edge information and the edge location information, which are generated finally through median filtering, are used in the processes of weight determination and interpolation information generation at steps S940 and S950. Since the weight is determined with respect to each pixel included in one block by checking the edge location information, detailed information of the edge and the adjacent pixels can be expressed.

As described above, the technology of the present invention can enlarge a digital image at a high magnification or prevent image quality degradation that occurs when the image is transformed into a high-resolution image. Particularly, it can provide details of the areas around the edge, while expressing the edge area smoothly and clearly. Furthermore, a high-resolution image is produced by resolving the problem that the edge area becomes bright and dark repeatedly, a phenomenon that occurs when a part gradually brightened or darkened is enlarged. The image transforming apparatus and method of the present invention can be applied when an image photographed by a digital camera or a camera of a mobile terminal is enlarged on a display or printed and enlarged.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An apparatus for transforming an image, comprising:
a linear interpolation block for generating linear interpolation information for an interpolation pixel to be interpolated between original pixels of a predetermined image;

an edge information generating block for generating edge information which represents a pixel value of a pixel for indicating an edge and generating edge location information for indicating a location of an edge area of the image using two threshold values, within each of blocks consisting of the original pixel and interpolation pixel, respectively;

a weight determining block for determining a weight for the linear interpolation information and the edge information of the interpolation pixel based on the edge location information;

an interpolation information generating block for determining a pixel value of the interpolation pixel by reflecting the weight to the edge information and the linear interpolation information; and an interpolating block for generating the interpolation pixel based on the pixel value determined in the interpolation information generating block.

2. The apparatus as recited in claim 1, further comprising an edge determining block for determining whether a predetermined block is an edge block that includes the edge surface, when the image is divided into a plurality of blocks, each comprising the original pixels and a predetermined number of interpolation pixels, wherein, if the block is not determined to be the edge block, the interpolating block generates the interpolation pixels based on the linear interpolation information.

3. The apparatus as recited in claim 1, wherein the edge information generating block comprises:

a threshold value determining unit for determining a predetermined upper threshold value and a predetermined lower threshold value;

a primary edge information generating unit for comparing the linear interpolation information with the upper threshold value and the lower threshold value, and generating primary edge information for indicating pixel values of the pixels in the block and primary edge location information for indicating a location of a pixel that forms the edge surface; and a filtering unit for converting the primary edge information into the edge information by performing median filtering and transforming the primary edge location information into the edge location information based on the transformed edge information.

4. The apparatus as recited in claim 3, wherein the threshold value determining unit calculates the upper threshold value and the lower threshold value based on an equation, which is expressed as:

$$Th1 = \frac{\text{Max} + \text{Min}}{2} + \alpha, \quad Th2 = \frac{\text{Max} + \text{Min}}{2} - \alpha,$$

wherein Th1 denotes the upper threshold value, Th2 denotes the lower threshold value, Max and Min denote the maximum pixel value and the minimum pixel value among pixel values of adjacent pixels of an original pixel, respectively, and α denotes an arbitrary constant.

5. The apparatus as recited in claim 3, wherein the primary edge information generating unit generates the primary edge information and the primary edge location information based on an equation which is expressed as:

When LI>Th1: Et=Max, Lt=0

When LI<Th2: Et=Min, Lt=0

When Th2<LI<Th1:

$$Et = \frac{(\text{Max} - \text{Min}) \times (LI - Th1)}{(Th1 - Th2)} + \text{Min}, \quad Lt = 1,$$

wherein LI denotes linear interpolation information, Et denotes primary edge information, Lt denotes primary edge location information, Th1 denotes an upper threshold value, Th2 denotes a lower threshold value, and Max and Min denote the maximum pixel value and the minimum pixel value among pixel values of adjacent pixels of an original pixel, respectively.

6. The apparatus as recited in claim 5, wherein the filtering unit determines a predetermined size of a window with a predetermined pixel of the block at the center, arranges primary edge information of each pixel of the window sequentially, and determines a median thereof as the edge information of the pixel.

7. The apparatus as recited in claim 1, wherein the weight determining block determines a weight for edge information of each pixel in the block based on an equation which is expressed as:

$$w = \frac{d1}{d1 + d2},$$

wherein w denotes a weight, and d1 denotes a distance to a non-edge block among adjacent blocks, and d2 denotes a distance to an edge area in the block.

8. The apparatus as recited in claim 1, wherein the interpolation information generating block comprises:

a first multiplier for multiplying the edge information by a first weight;

a second multiplier for multiplying the linear interpolation information by a second weight; and an adder for adding operation results of the first multiplier and the second multiplier.

9. An image transforming method of an apparatus for transforming an image, comprising the steps of:

a) generating linear interpolation information for an interpolation pixel to be interpolated between original pixels of a predetermined image;

b) generating edge information which signifies a pixel value of a pixel for indicating an edge of the image and generating edge location information for indicating a location of an edge area of the image using two threshold values, within each of blocks consisting of the original pixel and interpolation pixel, respectively;

c) determining a weight for the linear interpolation information and the edge information of the interpolation pixel based on the edge location information;

d) determining a pixel value of the interpolation pixel by reflecting the weight to the edge information and the linear interpolation information; and e) generating the interpolation pixel based on the determined pixel value, wherein the steps are preformed by the apparatus.

10. The method as recited in claim 9, further comprising:

f) determining whether a predetermined block is an edge block that comprises the edge surface, when the image is divided into a plurality of blocks, each comprising the original pixels and a predetermined number of interpolation pixels, g) generating the interpolation pixels based on the linear interpolation information if the block is not determined to be the edge block.

11. The method as recited in claim 10, wherein the step b) comprises the sub-steps of:
   b1) determining a predetermined upper threshold value and a predetermined lower threshold value;
   b2) comparing the linear interpolation information with the upper threshold value and the lower threshold value;
   b3) generating primary edge information for expressing pixel values of the pixels in the block and primary edge location information for expressing a location of a pixel that forms the edge surface;
   b4) converting the primary edge information into the edge information by performing median filtering; and
   b5) converting the primary edge location information into the edge location information based on the converted edge information.

12. The method as recited in claim 11, wherein, in the step b1), the upper threshold value and the lower threshold value are calculated based on an equation, which is expressed as:

$$Th1 = \frac{Max + Min}{2} + \alpha, \quad Th2 = \frac{Max + Min}{2} - \alpha,$$

wherein Th1 denotes the upper threshold value, Th2 denotes the lower threshold value, Max and Min denote the maximum pixel value and the minimum pixel value, respectively, among pixel values of adjacent pixels of an original pixel, respectively; and $\alpha$ denotes an arbitrary constant.

13. The method as recited in claim 11, wherein, in the step b3), the primary edge information and the primary edge location information are generated based on an equation which is expressed as:

When LI>Th1: Et=Max, Lt=0

When LI<Th2: Et=Min, Lt=0

When Th2<LI<Th1:

$$Et = \frac{(Max - Min) \times (LI - Th1)}{(Th1 - Th2)} + Min, \quad Lt = 1,$$

wherein LI denotes linear interpolation information, Et denotes primary edge information, Lt denotes primary edge location information, Th1 denotes an upper threshold value, Th2 denotes a lower threshold value, and Max and Min denote the maximum pixel value and the minimum pixel value among pixel values of adjacent pixels of an original pixel, respectively.

14. The method as recited in claim 11, wherein the step b4) comprises the sub-steps of:
   b4-1) determining a predetermined size of a window with a predetermined pixel of the block at the center; and
   b4-2) arranging primary edge information of each pixel of the window sequentially, and determining a median thereof as the edge information of the pixel.

15. The method as recited in claim 9, wherein, in the step c), a weight for edge information of each pixel in the block is determined based on an equation which is expressed as:

$$w = \frac{d1}{d1 + d2},$$

wherein w denotes a weight, and d1 denotes a distance to a non-edge block among adjacent blocks, and d2 denotes a distance to an edge area in the block.

16. The method as recited in claim 9, wherein the step d) comprises the sub-steps of:
   d1) multiplying the edge information by a first weight;
   d2) multiplying the linear interpolation information by a second weight; and
   d3) adding operation results of the step d1) and the step d2).

* * * * *

UNITED STATES PATENT AND TRADEMARK OFFICE
CERTIFICATE OF CORRECTION

PATENT NO.       : 7,609,912 B2
APPLICATION NO.  : 11/090566
DATED            : October 27, 2009
INVENTOR(S)      : Won-Seok Chae It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this

Twelfth Day of October, 2010

David J. Kappos
*Director of the United States Patent and Trademark Office*